(12) United States Patent
Atkinson et al.

(10) Patent No.: US 7,946,117 B2
(45) Date of Patent: *May 24, 2011

(54) ONBOARD METHOD OF DETERMINING EGR FLOW RATE

(75) Inventors: David C. Atkinson, Dunlap, IL (US);
Christopher F. Gallmeyer, Peoria, IL (US); Ashutosh Katari, Peoria, IL (US);
Brian V. Tranel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 841 days.

This patent is subject to a terminal disclaimer.

(21) Appl. No.: 11/819,876

(22) Filed: Jun. 29, 2007

(65) Prior Publication Data

US 2008/0141757 A1 Jun. 19, 2008

Related U.S. Application Data

(63) Continuation-in-part of application No. 11/639,160, filed on Dec. 15, 2006, now Pat. No. 7,320,220.

(51) Int. Cl.
*F02B 33/44* (2006.01)

(52) U.S. Cl. .................. 60/605.2; 60/611; 123/568.19

(58) Field of Classification Search ............... 60/605.1, 60/605.2, 611; 123/568.19, 559.1
See application file for complete search history.

(56) References Cited

U.S. PATENT DOCUMENTS

| | | | |
|---|---|---|---|
| 4,285,318 A | 8/1981 | Yoneda et al. | |
| 4,300,490 A | 11/1981 | Hattori et al. | |
| 4,406,161 A | 9/1983 | Locke et al. | |
| 4,723,443 A | 2/1988 | Usui et al. | |
| 5,205,260 A | 4/1993 | Takahashi et al. | |
| 5,375,620 A | 12/1994 | Ginder, Jr. | |
| 6,347,519 B1 | 2/2002 | Kreso | |
| 6,352,001 B1 | 3/2002 | Wickert et al. | |
| 6,422,220 B1 | 7/2002 | Lepp et al. | |
| 6,516,785 B1 | 2/2003 | Nakada et al. | |
| 6,609,058 B1 * | 8/2003 | Russell et al. | 701/104 |
| 6,609,374 B2 | 8/2003 | Feucht et al. | |
| 6,843,239 B2 | 1/2005 | Fensom et al. | |
| 6,886,544 B1 | 5/2005 | Bui | |
| 6,997,162 B2 | 2/2006 | Hirayama et al. | |
| 7,013,870 B2 | 3/2006 | Kamimura et al. | |
| 7,016,779 B2 | 3/2006 | Bowyer | |
| 7,121,268 B2 | 10/2006 | Andoh et al. | |
| 7,174,250 B2 | 2/2007 | Barba et al. | |
| 7,320,220 B1 * | 1/2008 | Atkinson | 60/605.2 |

FOREIGN PATENT DOCUMENTS

EP  1 681 455 A1  7/2006
EP  1 701 029 A1  9/2006

OTHER PUBLICATIONS

Office Action in U.S. Appl. No. 11/639,160, dated Feb. 22, 2007.
Office Action in U.S. Appl. No. 11/639,160, dated Jun. 28, 2007.
Notice of Allowability in U.S. Appl. No. 11/639,160, dated Sep. 12, 2007.

* cited by examiner

*Primary Examiner* — Hoang M Nguyen
(74) *Attorney, Agent, or Firm* — Finnegan, Henderson, Farabow, Garrett & Dunner LLP

(57) ABSTRACT

A method of determining and regulating a mass flow rate exhaust gases recirculated into an engine is disclosed. The method may comprise directing the exhaust gases through a venturi and sensing a differential exhaust pressure across the venturi. The method may further include sensing an absolute exhaust pressure at the venturi, and sensing a temperature of the exhaust gases. The method may further include determining the mass flow rate of the exhaust based on the sensed differential fluid pressure, absolute fluid pressure, and temperature.

20 Claims, 4 Drawing Sheets

ONBOARD METHOD OF DETERMINING EGR FLOW RATE

RELATED APPLICATIONS

This application is a continuation-in-part of U.S. patent application Ser. No. 11/639,160 by David C. Atkinson, filed Dec. 15, 2006, now U.S. Pat. No. 7,320,220 the entire disclosure of which is incorporated herein by reference.

TECHNICAL FIELD

The present disclosure relates generally to method of determining a mass flow rate and, more particularly, to a method of determining an exhaust gas recirculation mass flow rate from onboard an internal combustion engine.

BACKGROUND

Engines, including diesel engines, gasoline engines, natural gas engines, and other engines known in the art, exhaust a complex mixture of air pollutants. The air pollutants may be composed of gaseous and solid material, which include Nitrogen Oxides (NOx) and particulate matter. Due to increased attention on the environment, exhaust emission standards have become more stringent and the amount of NOx and particulates emitted from an engine may be regulated depending on the type of engine, size of engine, and/or class of engine.

One method that has been implemented by engine manufacturers to comply with the regulation of NOx and particulate matter exhausted to the environment has been to recirculate exhaust gas from an engine back into the engine for subsequent combustion. The recirculated exhaust gas reduces the concentration of oxygen in the intake air supplied to the engine, which in turn lowers the maximum combustion temperature within cylinders of the engine. The reduced temperature decreases the formation of NOx. In addition, the exhaust gases contain some amount of particulate matter, which is burned upon recirculation through the engine cylinders, thereby lowering the amount of particulate matter exhausted to the environment.

When implementing exhaust gas recirculation (EGR), it may be necessary to tightly control the proportion of exhaust gas recirculated through the engine relative to fresh air drawn into the engine. For example, if the amount of exhaust gas recirculated through the engine is too great, the engine may not receive enough oxygen for proper operation and could possibly stall, produce insufficient levels of power, and/or produce excessive amounts of smoke and particulate matter because of poor combustion within the engine cylinders. Conversely, if the amount of exhaust gas recirculated into the engine is too little, the engine may not comply with NOx regulations.

Typically, the flow of exhaust gas back into the engine is regulated by way of a throttle arrangement in response to one or more input. The throttle arrangement generally includes a butterfly-type valve element disposed within an exhaust gas passageway and movable between open and closed positions to selectively pass or restrict the flow of exhaust gas to the intake of the engine. The valve element is moved between the open and closed positions based on a sensed mass flow rate of the exhaust. That is, a mass flow rate sensor is located within the exhaust gas passageway upstream or downstream of the throttle arrangement to generate a signal indicative of the flow rate of exhaust passing into the engine. A controller located elsewhere on the engine receives the exhaust flow rate signal, and generates a position command directed to a drive motor of the throttle arrangement.

One attempt at determining the flow rate and regulating the flow rate of air with a compact arrangement is described in U.S. Pat. No. 6,997,162 (the '162 patent), issued to Hirayama et al. on Feb. 14, 2006. Specifically, the '162 patent describes an electronically controlled throttle body having a main air passage and a valve element disposed therein. The valve element is driven by a motor, which is externally mounted to the throttle body in a generally perpendicular direction relative to the main air passage. The '162 patent also describes determining mass flow via a hot wire-type air flow meter, and a microcomputer integrated together with the main air passage, the valve element, and the motor to form a single body. The microcomputer receives signals from the flow meter indicative of the flow rate of fresh air entering the engine, calculates a pressure of the air based on the signals from the flow meter, and controls the drive motor to move the valve element based on the flow rate signals and calculated pressure.

Although the '162 patent may describe the regulation of an air flow rate into an internal combustion engine, it may still have a limited use. In particular, because the method receives the mass flow rate signal from a mass flow sensor, rather than determining the mass flow rate based on temperature and pressure, it may be more costly or require more computing power.

The disclosed method of determining EGR mass flow rate is directed to overcoming one or more of the problems set forth above.

SUMMARY OF THE INVENTION

In one aspect, the present disclosure is directed to a method of determining and regulating a mass flow rate exhaust gases recirculated into an engine. The method may comprise directing the exhaust gases through a venturi and sensing a differential exhaust pressure across the venturi. The method may further include sensing an absolute exhaust pressure at the venturi, and sensing a temperature of the exhaust gases. The method may further include determining the mass flow rate of the exhaust based on the sensed differential fluid pressure, absolute fluid pressure, and temperature.

In another aspect, the present disclosure is related to a method of determining and regulating a mass flow rate of exhaust gases recirculated into an engine. The method may comprise constricting a flow of exhaust gases and determining the mass flow rate of the exhaust gases based on a sensed differential fluid pressure across the constriction and an absolute pressure measured upstream of the constriction.

DETAILED DESCRIPTION

Figure 1:
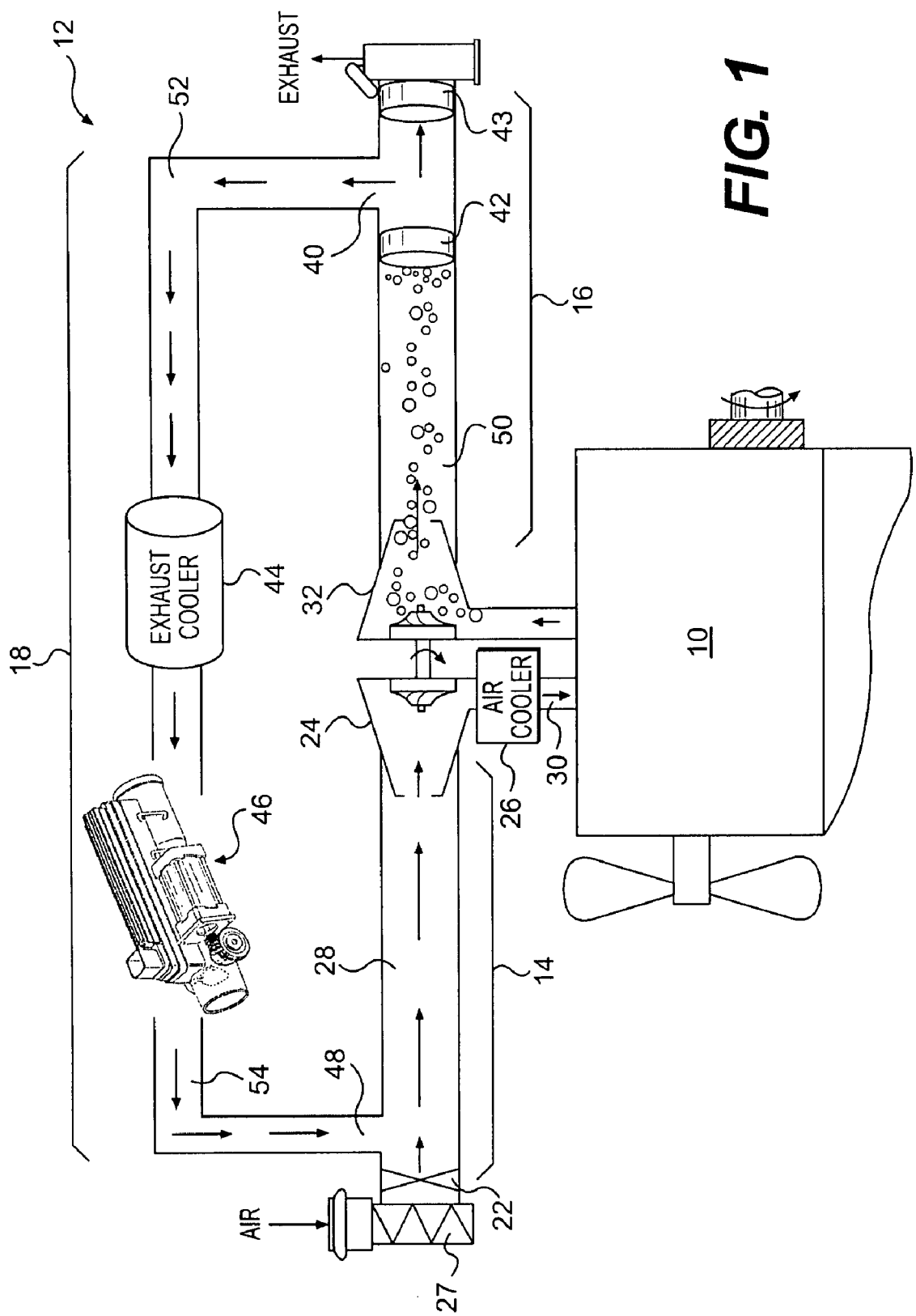
FIG. 1 is a diagrammatic illustration of an exemplary disclosed power source.

FIG. 1 illustrates a power source 10 having an exemplary exhaust treatment system 12. Power source 10 may include an engine such as, for example, a diesel engine, a gasoline engine, a gaseous fuel-powered engine such as a natural gas engine, or any other engine apparent to one skilled in the art. Power source 10 may, alternatively, include another source of power such as a furnace. Exhaust treatment system 12 may include an air induction system 14, an exhaust system 16, and a recirculation system 18 coupled to power source 10 to transfer fluids into and out of power source 10.

Air induction system 14 may include a means for introducing charged air into a combustion chamber (not shown) of power source 10. For example, air induction system 14 may include an induction valve 22, one or more compressors 24, and an air cooler 26. It is contemplated that additional and/or different components may be included within air induction system 14 such as, for example, one or more air cleaners 27, a waste gate or bypass circuit associated with compressors 24, a control system, and other means known in the art for introducing charged air into the combustion chambers of power source 10.

Induction valve 22 may regulate the flow of atmospheric air from cleaner 27 to compressors 24. Induction valve 22 may include, for example, a butterfly element, a shutter element, a gate element, a ball element, a globe element, or any other type of valve element known in the art. The element of induction valve 22 may be disposed within a passageway 28 and be movable from a flow passing position against a spring bias toward a flow restricting position. In one example, the element of induction valve 22 may be connected to a torsional spring (not shown) that may bias the element toward the flow restricting position. When in the flow passing position, atmospheric air may be directed through compressors 24 into power source 10 substantially unrestricted.

Compressors 24 may be disposed in a series relationship and fluidly connected to power source 10 to compress the air flowing into power source 10 to a predetermined level. Each of compressors 24 may embody a fixed geometry compressor, a variable geometry compressor, or any other type of compressor known in the art. It is contemplated that compressors 24 may alternatively be disposed in a parallel relationship or that air induction system 14 may include only a single compressor 24. It is further contemplated that compressors 24 may be omitted, when a non-pressurized air induction system is desired.

Air cooler 26 may be an air-to-air heat exchanger or an air-to-liquid heat exchanger and located to facilitate the transfer of heat to or from the air directed into power source 10. For example, air cooler 26 may embody a tube and shell type heat exchanger, a plate type heat exchanger, a tube and fin type heat exchanger, or any other type of heat exchanger known in the art. Air cooler 26 may be disposed within a passageway 30 that fluidly connects compressors 24 to power source 10.

Exhaust system 16 may include a means for directing exhaust flow out of power source 10. For example, exhaust system 16 may include one or more turbines 32 connected in a series relationship. It is contemplated that exhaust system 16 may include additional and/or different components such as, for example, emission controlling devices such as particulate filters 42, NOx absorbers 43, or other catalytic devices; attenuation devices; and other means known in the art for directing exhaust flow out of power source 10.

Each turbine 32 may be connected to one compressor 24 to drive the connected compressor 24. In particular, as the hot exhaust gases exiting power source 10 expand against blades (not shown) of turbine 32, turbine 32 may rotate and drive the connected compressor 24. It is contemplated that turbines 32 may alternatively be disposed in a parallel relationship or that only a single turbine 32 may be included within exhaust system 16. It is also contemplated that turbines 32 may be omitted and compressors 24 driven by power source 10 mechanically, hydraulically, electrically, or in any other manner known in the art, if desired.

Particulate filter 42 may be disposed downstream of turbines 32 to remove particulates from the exhaust flow directed from power source 10. It is contemplated that particulate filter 42 may include electrically conductive or non-conductive coarse mesh elements. It is also contemplated that particulate filter 42 may include a catalyst for reducing an ignition temperature of the particulate matter trapped by particulate filter 42, a means for regenerating the particulate matter trapped by particulate filter 42, or both a catalyst and a means for regenerating. The catalyst may support the reduction of HC, CO, and/or particulate matter, and may include, for example, a base metal oxide, a molten salt, and/or a precious metal. The means for regenerating may include, among other things, a fuel-powered burner, an electrically-resistive heater, an engine control strategy, or any other means for regenerating known in the art. It is further contemplated that particulate filter 42 may be omitted or located downstream of inlet port 40, if desired. It is further contemplated that an additional particulate filter (not shown) may be located within recirculation system 18, if desired.

NOx absorber 43 may include one or more substrates coated with or otherwise containing a liquid or gaseous catalyst such as, for example, a precious metal-containing washcoat. The catalyst may be utilized to reduce the byproducts of combustion in the exhaust flow by means of selective catalytic reduction (SCR) or NOx trapping. In one example, a reagent such as urea may be injected into the exhaust flow upstream of NOx absorber 43. The urea may decompose to ammonia, which reacts with NOx in the exhaust to form $H_2O$ and $N_2$. In another example, NOx in the exhaust may be trapped by a barium salt-containing device and be periodically released and reduced across a catalyst to form $CO_2$ and $N_2$. NOx absorber 43 may also be utilized to oxidize particulate matter that remains in the exhaust flow after passing through particulate filter 42, if desired.

Recirculation system 18 may include a means for redirecting a portion of the exhaust flow of power source 10 from exhaust system 16 into air induction system 14. For example, recirculation system 18 may include an inlet port 40, an exhaust cooler 44, a recirculation valve arrangement 46, and a discharge port 48. It is contemplated that recirculation system 18 may include additional and/or different components such as a catalyst, an electrostatic precipitation device, a shield gas system, and other means known in the art for redirecting exhaust from exhaust system 16 into induction system 14. As a portion of the exhaust from power source 10 enters recirculation system 18 via inlet port 40, the temperature thereof may be reduced to an acceptable level by cooler 44, restricted to a desired flow rate by recirculation valve arrangement 46, and directed into induction system 14 via outlet port 48.

Inlet port 40 may be connected to exhaust system 16 to receive at least a portion of the exhaust flow from power source 10. Specifically, inlet port 40 may be disposed downstream of turbines 32 to receive low-pressure exhaust gases from turbines 32. It is contemplated that inlet port 40 may alternatively be located upstream of turbines 32 to receive high-pressure exhaust gases, if desired.

Exhaust cooler 44 may be disposed within a fluid passageway 52 downstream of particulate filter 42 to cool the portion of exhaust flowing through inlet port 40. Exhaust cooler 44 may include a liquid-to-air heat exchanger, an air-to-air heat exchanger, or any other type of heat exchanger known in the art for cooling an exhaust flow. It is contemplated that exhaust cooler 44 may be omitted, if desired.

Recirculation valve arrangement 46 may be fluidly connected to exhaust cooler 44 via a fluid passageway 54 to regulate the flow of exhaust through recirculation system 18. Recirculation valve arrangement 46 may be operable to selectively pass or restrict the flow of exhaust therethrough. Although illustrated in FIG. 1 as being located downstream of exhaust cooler 44, it is contemplated that recirculation valve arrangement 46 may alternatively be located upstream of exhaust cooler 44, if desired.

Discharge port 48 may be fluidly connected to recirculation valve arrangement 46 to direct the exhaust flow regulated by recirculation valve arrangement 46 into air induction system 14. Specifically, discharge port 48 may be connected to air induction system 14 upstream of compressors 24, such that compressors 24 may draw the exhaust flow from discharge port 48.

Figure 2:
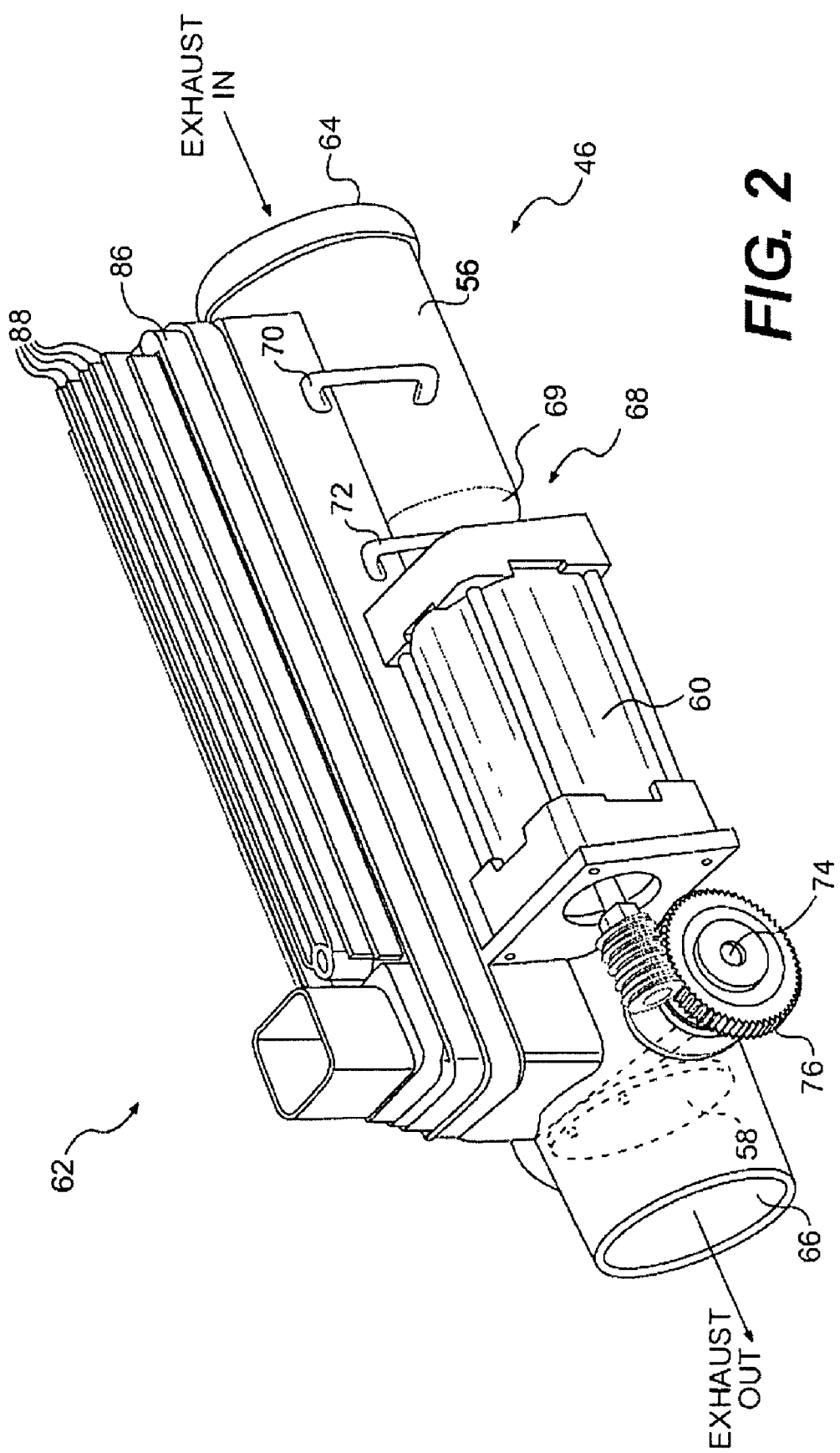
FIG. 2 is a pictorial view illustration of an exemplary disclosed exhaust gas recirculation valve arrangement for use with the power source of FIG. 1.

As illustrated in FIG. 2, recirculation valve arrangement 46 may be an assembly of multiple components that interact to regulate the flow of exhaust. For example, recirculation valve arrangement 46 may include a common housing 56, a valve element 58, a drive motor 60, and a control system 62. In response to one or more input, control system 62 may selectively actuate drive motor 60 to move valve element 58 between a flow passing and a flow blocking position, thereby variably restricting the flow of exhaust through common housing 56.

Common housing 56 may include an inlet 64, an outlet 66, a venturi 68, and a plurality of external fluid passageways. Exhaust may enter common housing 56 via inlet 64, flow through venturi 68, and exit common housing 56 via outlet 66. As the exhaust flows through a throat area 69 of venturi 68, the exhaust flow may be constricted, causing an increase in exhaust velocity and a decrease in exhaust pressure. While flowing through venturi 68, a portion of the exhaust from upstream of throat area 69 may be redirected to control system 62 via a first flow path 70, and a portion of the exhaust from throat area 69 may be redirected to control system 62 via a second flow path 72. The pressure difference between the exhaust flowing through first flow path 70 and the exhaust flowing through second flow path 72 caused by the constriction at throat area 69 may be utilized to determine a rate of the exhaust flowing through recirculation valve arrangement 46, as will be described in more detail below. It should be noted that, while first and second flow paths 70 and 72 are illustrated in FIG. 2 as being generally located on the same side of common housing 56 as drive motor 60, it is contemplated that flow paths 70 and 72 may alternatively be located on opposing or adjacent sides of common housing 56, if desired.

Valve element 58 may be disposed within common housing 56 downstream of venturi 68 to selectively restrict the flow of exhaust to power source 10. Because of its location downstream of venturi 68, valve element 58 and, more specifically, the disrupted flow of exhaust across valve element 58 may have little affect, if any, on the components within first and second flow paths 70, 72. Valve element 58 may embody, for example, a butterfly element fixedly connected to a rotatable driveshaft 74. As driveshaft 74 is rotated, valve element 58 may move from a flow blocking position toward a flow restricting position. The term restricted, for the purposes of this disclosure, is to be interpreted as at least partially blocked from fluid flow. It is also contemplated that valve element 58, when in a flow restricting position, may be fully blocked from fluid flow.

Drive motor 60 may be situated to rotate driveshaft 74 and connected valve element 58. For example, drive motor 60 may embody a brushless DC rotary actuator mounted to common housing 56 and connected to driveshaft 74 to move valve element 58 between the flow passing and flow restricting position in a smooth continuous or step-wise manner. Drive motor 60 may be directly connected to driveshaft 74 or, alternatively, may be connected via a gear train 76, a ratcheting device, a pulley system, or in any other appropriate manner. It is contemplated that drive motor 60 may selectively rotate driveshaft 74 in response to one or more input commands from control system 62.

In one embodiment, drive motor 60 may be mounted to conserve space. Specifically, drive motor 60 may have an axial direction generally orthogonal to a rotation of drive motor 60. Drive motor 60 may be mounted to common housing 56 such that the axial direction of drive motor 60 is substantially parallel with a flow direction of exhaust through common housing 56. In this arrangement, gear train 76 may embody a worm/spur gear configuration to accommodate the parallel arrangement. By arranging drive motor 60 parallel with common housing 56, space consumed by drive motor 60 in a transverse direction (i.e., a direction transverse to the flow of exhaust through housing 56) may be minimized.

Figure 3:
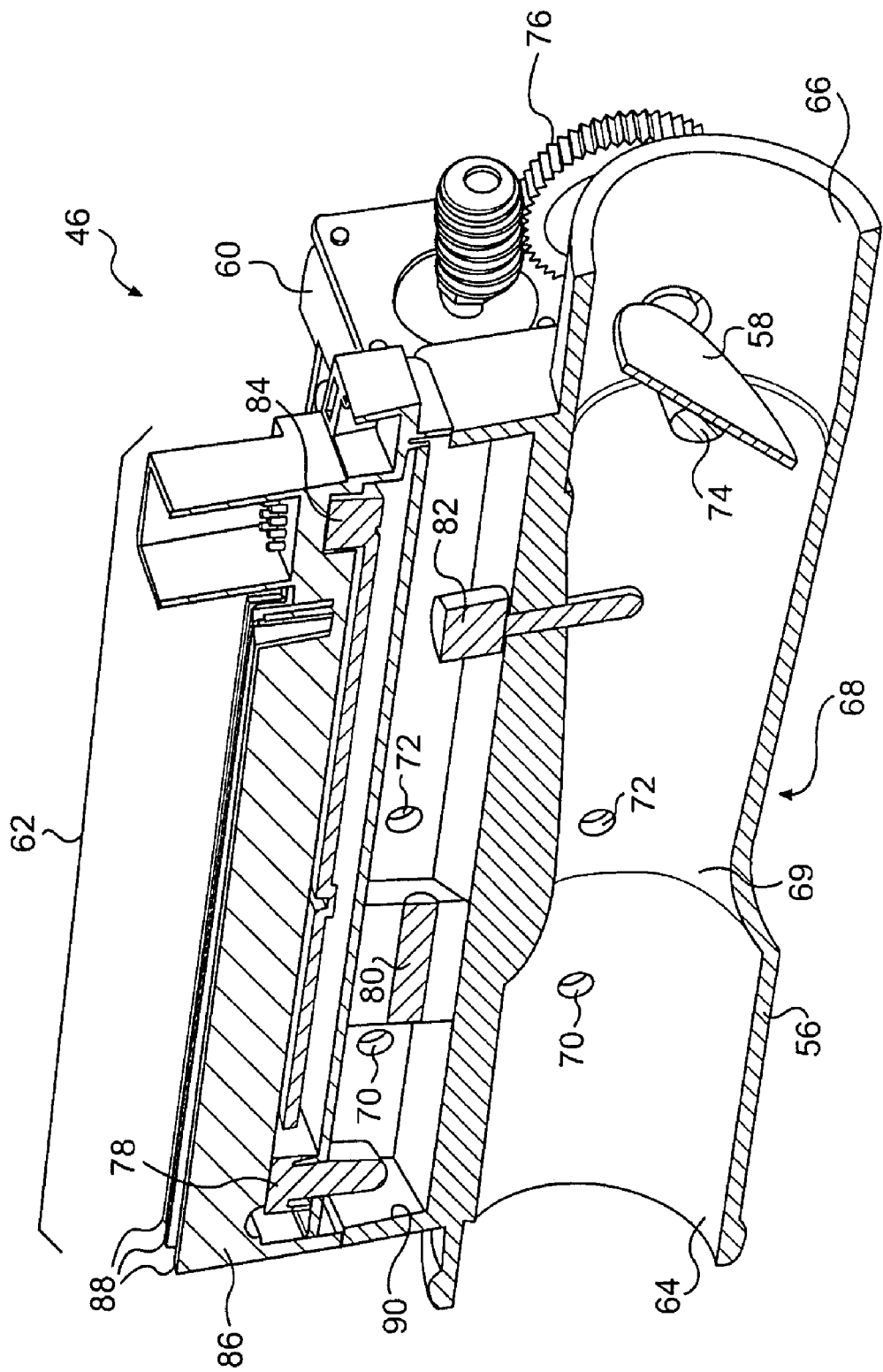
FIG. 3 is a cutaway view illustration of the exhaust gas recirculation valve arrangement of FIG. 2.

As illustrated in FIG. 3, control system 62 may include components that interact to determine operational characteristics of the exhaust flowing through recirculation valve arrangement 46 and to regulate the flow in response thereto. In particular, control system 62 may include an absolute pressure sensor 78, a differential pressure sensor 80, a temperature sensor 82, and a controller 84. Controller 84 may receive input from absolute pressure sensor 78, differential pressure sensor 80, and temperature sensor 82, and in response thereto, command movement of drive motor 60. A cooling cover 86 having fins 88 may be associated with the components of control system 62 to facilitate air-cooling thereof. It is also contemplated that fluid may alternatively or additionally be circulated through cooling cover 86 for enhanced cooling, if desired.

Absolute pressure sensor 78 may be located in fluid communication with exhaust entering recirculation valve arrangement 46 to determine a pressure of the exhaust. For example, absolute pressure sensor 78 may be located in fluid communication with first flow path 70 via a recess 90 between an external surface of common housing 56 and an internal surface of cooling cover 86. Absolute pressure sensor 78 may embody a vacuum type pressure sensor and generate a signal indicative of the absolute pressure within recess 90 (i.e., the pressure magnitude above the reference vacuum pressure). This absolute pressure signal may then be communicated to controller 84.

Differential pressure sensor 80 may be located in fluid communication with exhaust entering recirculation valve arrangement 46 and with exhaust at throat area 69 to determine a pressure differential between the two areas. For example, differential pressure sensor 80 may be located in fluid communication with first flow path 70 and in fluid communication with second flow path 72 via recess 90. Differential pressure sensor 80 may compare the pressure of exhaust within first flow path 70 with the pressure of the exhaust within second flow path 72 and generate a signal indicative of the pressure difference. This differential pressure signal may then be communicated to controller 84.

Temperature sensor 82 may be located in fluid communication with exhaust exiting recirculation valve arrangement 46 to determine a temperature of the exhaust. For example, temperature sensor 82 may be a surface-temperature-type sensor that measures the temperature of common housing 56 at outlet 66 where the exhaust exits recirculation valve arrangement 46. Alternatively, temperature sensor 82 may be an air-temperature-type sensor that directly measures the temperature of the exiting exhaust. It is also contemplated that temperature sensor 82 may alternatively be located at inlet 64 of common housing 56, if desired. Temperature sensor 82 may generate a signal indicative of the exhaust temperature and communicate this temperature signal to controller 84.

Controller 84 may embody a single microprocessor or multiple microprocessors that include a means for controlling an operation of recirculation valve arrangement 46. Numerous commercially available microprocessors can be configured to perform the functions of controller 84. It should be appreciated that controller 84 could readily embody a general engine microprocessor capable of controlling numerous engine functions. Controller 84 may include a memory, a secondary storage device, a processor, and other components for running an application. Various other circuits may be associated with controller 84 such as power supply circuitry, signal conditioning circuitry, solenoid driver circuitry, and other types of circuitry.

One or more maps relating absolute pressure, differential pressure, temperature, actual flow rate, and/or desired flow rate may be stored in the memory of controller 84. Each of these maps may be in the form of tables, graphs, and/or equations. Controller 84 may receive the signals generated by absolute pressure sensor 78, differential pressure sensor 80, and temperature sensor 82, and reference the map(s) stored in the memory thereof. From these maps, controller 84 may determine a position command, torque command, velocity command, or other similar command directed to drive motor 60 that affects a desired movement of valve element 58 and subsequent flow rate of exhaust through recirculation valve arrangement 46.

In one example, an equation, EQ. 1 may be stored in the memory of control 84 and, as described below, utilized to calculate the mass flow rate of exhaust:

$$\dot{Q} = \rho \sqrt{\frac{1}{1-\left(\frac{D_{throat}}{D_{inlet}}\right)^4}} (\pi D_{throat}^2) \sqrt{\frac{2(\Delta p)}{\rho}} \qquad \text{EQ. 1}$$

wherein:
$\dot{Q}$=mass flow rate of exhaust;
$\rho$=density of exhaust;
$D_{throat}$=diameter at throat;
$D_{inlet}$=diameter at inlet; and
$\Delta p$=pressure difference between inlet and throat.

As seen from EQ. 1 above, based on the pressure differential signal, known geometry of inlet 64 and throat area 69, and the density of exhaust passing through recirculation valve arrangement 46, the mass flow rate of the exhaust passing through recirculation valve arrangement 46 may be calculated. The density of exhaust used as an input to EQ. 1 may be calculated according to EQ. 2 below:

$$\rho = \frac{pR}{T} \qquad \text{EQ. 2}$$

wherein:
$\rho$=density of exhaust;
p=absolute pressure of exhaust at inlet;
R=gas constant of exhaust; and
T=temperature of exhaust.

Based on a comparison of the exhaust mass flow rate $\dot{Q}$ with a desired exhaust mass flow rate, controller 84 may either increase or decrease the restriction provided by valve element 58. For example, if $\dot{Q}$ is less than a desired mass flow rate, controller 84 may command drive motor 60 to move valve element 58 toward the flow passing position. In contrast, if $\dot{Q}$ is greater than a desired mass flow rate, controller 84 may command drive motor 60 to move valve element 58 toward the flow restricting position.

Figure 4:
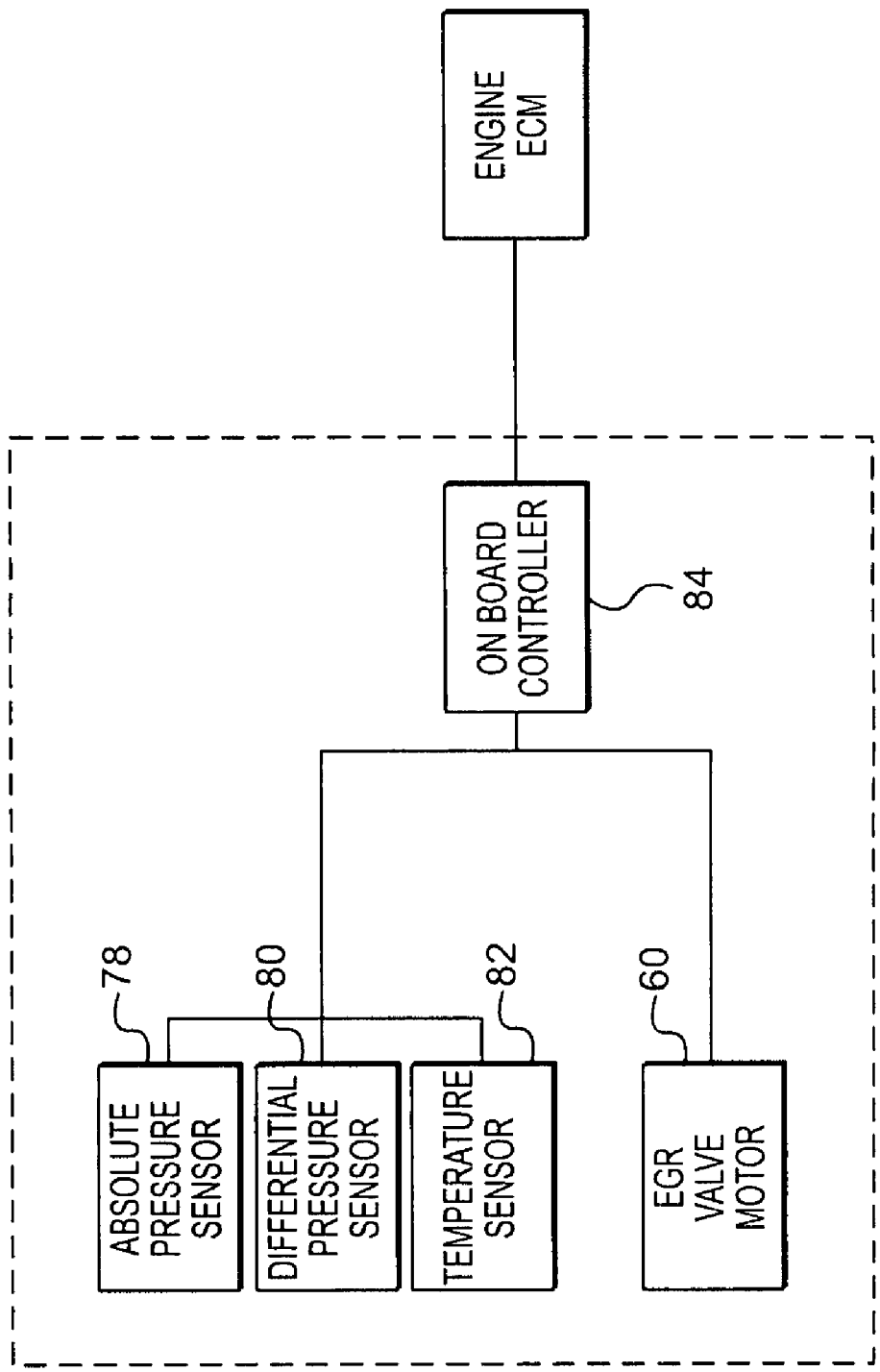
FIG. 4 is a control diagram depicting an exemplary disclosed operation of the power source of FIG. 1.

FIG. 4 illustrates a control diagram associated with operation of recirculation valve arrangement 46. From this diagram, it can be seen that most of the control associated with recirculation valve arrangement 46 can be accomplished internally. That is, because recirculation valve arrangement 46 integrates controller 84, absolute pressure sensor 78, differential pressure sensor 80, temperature sensor 82, drive motor 60, and valve element 58 into a single assembly, the only communication between recirculation valve arrangement 46 and a controller of power source 10 may include the receipt of a desired flow rate. As such, extensive testing and calibration of recirculation valve arrangement 46 may be completed before arrangement 46 is even assembled to power source 10.

INDUSTRIAL APPLICABILITY

The disclosed flow rate determination method may be applicable to any combustion-type device such as, for example, an engine, a furnace, or any other combustion device known in the art where precise and reliable fluid regulation is necessary. The disclosed method may be particularly applicable to exhaust treatment systems that benefit from a simple, inexpensive, and compact solution to controlling the amount of exhaust gas directed into the combustion device. The operation of exhaust treatment system 12 will now be explained.

Atmospheric air may be drawn through induction valve 22 by compressors 24 where it may be pressurized to a predetermined level before entering the combustion chambers of power source 10. Fuel may be mixed with the pressurized air before or after entering the combustion chambers of power source 10, and the resulting mixture combusted to produce mechanical work and an exhaust flow containing gaseous compounds and solid particulate matter. The exhaust flow may be directed from power source 10 to turbines 32 where the expansion of hot exhaust gases may cause turbines 32 to rotate, thereby rotating connected compressors 24 to compress the inlet air. After exiting turbines 32 and flowing through particulate filter 42, the exhaust gas flow may be divided into two substantially particulate-free flows, including a first flow redirected to air induction system 14 and a second flow directed to the atmosphere.

The flow of the reduced-particulate exhaust directed through inlet port 40 may be cooled by exhaust cooler 44 to a predetermined temperature and then drawn through recirculation valve arrangement 46 back into air induction system 14 by compressors 24. To regulate the flow of exhaust back into air induction system 14, drive motor 60 may rotate driveshaft 74 to move valve element 59 between the flow passing and flow blocking positions. The controlled restriction of exhaust by valve element 58 may affect the amount of exhaust drawn by compressors 24 through air induction system 14 to power source 10.

The recirculated exhaust flow may then be mixed with the air entering the combustion chambers. The exhaust gas, which is directed to the combustion chambers of power source 10, may reduce the concentration of oxygen therein, which in turn lowers the maximum combustion temperature within power source 10. The lowered maximum combustion temperature may slow the chemical reaction of the combustion process, thereby decreasing the formation of nitrogen oxides. In this manner, the gaseous pollution produced by power source 10 may be reduced without experiencing the harmful effects and poor performance caused by excessive particulate matter being directed into power source 10. As the second flow of exhaust passes inlet port 40, it may be directed through a catalyst to remove NOx and other pollutants from the exhaust.

Controller 84 may control operation of recirculation valve arrangement 46. As the exhaust gas is directed through recirculation valve arrangement 46, controller 84 may determine and regulate a mass flow rate of the exhaust gas recirculated into power source 10. To determine the mass flow rate of the exhaust gas passing through recirculation valve arrangement 46, differential pressure sensor 80 may determine a differential pressure between first and second flow paths 70 and 72 and send a signal indicative of the differential pressure to controller 84. Absolute pressure sensor 78 may determine an absolute pressure of the exhaust gas through first flow path 70 and send a signal indicative of the absolute pressure to controller 84. Further, temperature sensor 82 may determine a temperature of the exhaust gas flowing through recirculation valve arrangement 46 and send a signal indicative of the temperature to controller 84. Though temperature sensor 82 is illustrated as being located downstream venturi 68 and upstream valve element 58, it is also contemplated that temperature sensor 82 may be located upstream of venturi 68 or any other appropriate location. Controller 84 may receive the signals from absolute pressure sensor 78, differential pressure sensor 80, and temperature sensor 82, and determine the mass flow rate of the exhaust based on the signals.

Controller 84 may determine the mass flow rate by retrieving the mass flow rate from stored tables based on the sensed differential pressure and a density of the exhaust. After determining the mass flow rate, controller 84 may compare the determined mass flow rate to a desired mass flow rate. Controller 84 may then determine a difference between the determined mass flow rate and the desired mass flow rate and move valve element 58 in response to the determined difference.

Because of the unique assembly configuration of drive motor 60 to common housing 56, the space on power system 10 may be conserved. That is, because the axial direction of drive motor 60 may be substantially parallel with a flow direction of exhaust through common housing 56, very little space in the transverse direction may be consumed. This conserved space may improve design flexibility associated with other components and systems of power source 10.

Because recirculation valve arrangement 46 utilizes a venturi-style flow meter, recirculation valve arrangement 46 may have extended use, as compared to the prior art. Specifically, because the differential pressure sensors utilized by arrangement 46 to determine flow rate may be minimally affected by the presence of soot, arrangement 46 may be have extended life and control accuracy, even when utilized in an exhaust treatment application.

Because the disclosed method utilizes pressure sensors and a temperature sensor to determine and regulate exhaust gas flow rate, it may have extended use, as compared to the prior art. Specifically, because the method of mass flow rate determination may be minimally affected by the presence of contaminants and soot in the exhaust gas, the method may be beneficial in exhaust gas recirculation systems and result in extended component life.

It will be apparent to those skilled in the art that various modifications and variations can be made to the disclosed method. Other embodiments will be apparent to those skilled in the art from consideration of the specification and practice of the disclosed method. It is intended that the specification and examples be considered as exemplary only, with a true scope being indicated by the following claims and their equivalents.

What is claimed is:

1. A method of determining a mass flow rate of exhaust gases recirculated into an engine, the method comprising:
    directing the exhaust gases through a venturi;
    sensing a differential exhaust pressure across the venturi;
    sensing an absolute exhaust pressure at the venturi;
    sensing a temperature of the exhaust gases; and
    determining the mass flow rate of the exhaust based on the sensed differential fluid pressure, absolute fluid pressure, and temperature.

2. The method of claim 1, wherein sensing the absolute exhaust pressure at the venturi includes sensing the absolute exhaust pressure at a location immediately upstream of the venturi.

3. The method of claim 1, wherein determining the mass flow rate includes calculating a density of the exhaust gases based on the sensed absolute fluid pressure and temperature.

4. The method of claim 1, wherein determining the mass flow rate includes retrieving the mass flow rate from stored tables based on the sensed differential pressure and a density of the exhaust gases.

5. The method of claim 1, further including:
    comparing the determined mass flow rate to a desired mass flow rate; and
    varying a flow rate of the exhaust gases in response to the comparison.

6. The method of claim 5, wherein the desired mass flow rate corresponds to a desired combustion characteristic of the engine.

7. The method of claim 1, further including:
    determining a difference between the determined mass flow rate and a desired mass flow rate; and
    varying a flow rate of the exhaust gases in response to the determined difference between the determined mass flow rate and the desired mass flow rate.

8. The method of claim 1, further including varying a flow rate of the exhaust gases at a location downstream of the venturi based on the determined mass flow rate.

9. The method of claim 1, wherein sensing a temperature of the exhaust gases includes sensing a temperature of a passageway wall.

10. The method of claim 1, wherein sensing an absolute exhaust pressure at the venturi includes comparing the pressure of the exhaust gases to a vacuum reference pressure.

11. The method of claim 10, wherein the absolute exhaust pressure is measured at a location upstream of the venturi.

12. The method of claim 1, wherein sensing the differential exhaust pressure across the venturi includes determining the differential exhaust pressure between a location upstream of a constriction of the venturi and a location within the constriction of the venturi.

13. The method of claim 1, wherein sensing a temperature includes sensing the temperature at a location downstream of the venturi.

14. The method of claim 1, wherein sensing a temperature includes sensing the temperature at a location upstream of the venturi.

15. A method of determining a mass flow rate of exhaust gases recirculated into an engine, the method comprising:

constricting a flow of exhaust gases; and determining the mass flow rate of the exhaust gases based on a sensed differential fluid pressure across the constriction, an absolute pressure measured upstream of the constriction, and a sensed temperature of the exhaust gases.

16. The method of claim 15, further including:

comparing the determined mass flow rate and a desired mass flow rate;

varying a flow rate of the exhaust gases in response to the comparison.

17. The method of claim 15, further including sensing the differential fluid pressure between a location upstream of the constriction and a location within the constriction.

18. The method of claim 1, further including directing the exhaust gases output from the venturi to a compressor prior to directing the exhaust gases to the engine.

19. A valve arrangement comprising:

a venturi;

a valve element disposed downstream from the venturi and configured to control a flow of exhaust directed through the valve element;

a differential pressure sensor configured to sense a differential pressure between a location upstream of a constriction of the venturi and a location within the constriction of the venturi;

an absolute pressure sensor configured to sense an absolute pressure in the venturi;

a temperature sensor configured to sense a temperature of the flow of exhaust; and a controller connected to the valve element, the differential pressure sensor, and the absolute pressure sensor, the controller being configured to:

determine a mass flow rate of the flow of exhaust based on the sensed differential pressure, the sensed absolute pressure, and the sensed temperature, and control the valve element to control the flow of exhaust directed through the valve element based on the determined mass flow rate.

20. The valve arrangement of claim 19, wherein:

the controller is further configured to determine the mass flow rate according to the following relationship:

$$\dot{Q} = K\sqrt{(\Delta p)\left(\frac{pR}{T}\right)};$$

and $\dot{Q}$ is the mass flow rate, K is a constant value, $\Delta p$ is the sensed differential pressure, p is the sensed absolute pressure, R is a gas constant associated with the flow of exhaust, and T is the sensed temperature.

* * * * *